(12) United States Patent
Joo et al.

(10) Patent No.: US 9,162,210 B2
(45) Date of Patent: Oct. 20, 2015

(54) SCC WITH IMPROVIED MOBILITY OF MATERIAL TO BE REMOVED

(75) Inventors: Eun-Jung Joo, Daejeon (KR); Dae-Young Shin, Daejeon (KR); Jong-Ku Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 117 days.

(21) Appl. No.: 14/116,600

(22) PCT Filed: May 25, 2012

(86) PCT No.: PCT/KR2012/004179
§ 371 (c)(1),
(2), (4) Date: Nov. 8, 2013

(87) PCT Pub. No.: WO2012/165818
PCT Pub. Date: Dec. 6, 2012

(65) Prior Publication Data
US 2014/0107302 A1    Apr. 17, 2014

(30) Foreign Application Priority Data

May 27, 2011  (KR) .................. 10-2011-0050640
May 25, 2012  (KR) .................. 10-2012-0056072

(51) Int. Cl.
*B01J 19/18*   (2006.01)
*B01J 19/00*   (2006.01)
*C08F 2/00*    (2006.01)
*C08F 2/01*    (2006.01)

(52) U.S. Cl.
CPC ............ *B01J 19/0053* (2013.01); *B01J 19/006* (2013.01); *B01J 19/18* (2013.01); *B01J 2219/00774* (2013.01); *B01J 2219/00777* (2013.01); *B01J 2219/00779* (2013.01); *B01J 2219/185* (2013.01); *B01J 2219/1943* (2013.01)

(58) Field of Classification Search
CPC ............. C08F 2/00; C08F 2/01; B01J 19/00; B01J 19/0053–19/0066; B01J 19/02; B01J 19/18; B01J 2219/00; B01J 2219/00761–2219/00779
See application file for complete search history.

(56) References Cited

U.S. PATENT DOCUMENTS 4,734,263 A    3/1988   Gerking et al.
4,995,945 A *  2/1991   Craig ........................... 202/177

FOREIGN PATENT DOCUMENTS

CN        1765486 A       5/2006
CN     201729787 U        2/2011
(Continued)

OTHER PUBLICATIONS

Riley et al., Industrial Application of Spinning Cone Column Technology: A Review, Internation Conference on Distillation & Absorption, 2002.*

*Primary Examiner* — Natasha Young
(74) *Attorney, Agent, or Firm* — Dentons US LLP

(57) ABSTRACT

A SCC (Spinning Cone Column) includes a housing having a rotation axis, a supply part of at least one reactant formed inside of the housing, at least two spinning cones that are installed so as to have a constant gradient from the upper part to the lower part to the rotation axis, move reactants supplied through the reactant supply part, and rotate around the rotation axis, a fixed cone that is fixed and formed on the inner side of the housing, and provides a pathway for sequentially moving reactant from a spinning cone at the upper part to a spinning cone at the lower part, a product collection part for collecting reactants moved through the spinning cone and the fixed cone, and a driving part for rotating the spinning cone.

15 Claims, 1 Drawing Sheet

(56) References Cited

FOREIGN PATENT DOCUMENTS

| | | |
|---|---|---|
| DE | 1083784 A | 6/1960 |
| DE | 65236 A | 1/1969 |
| EP | 0035661 A | 9/1981 |
| EP | 0191625 A2 | 8/1986 |
| FR | 1302176 A | 8/1962 |
| GB | 898796 A | 6/1962 |
| JP | 52-009622 A | 1/1977 |
| JP | S56-135507 A | 10/1981 |
| JP | S61-274705 A | 12/1986 |
| JP | 07-039726 A | 2/1995 |
| JP | 2005-313100 A | 11/2005 |
| JP | 2014-515416 A | 6/2014 |
| KR | 1020100021695 A | 2/2010 |
| WO | WO 2009/018997 A1 * | 2/2009 |

* cited by examiner

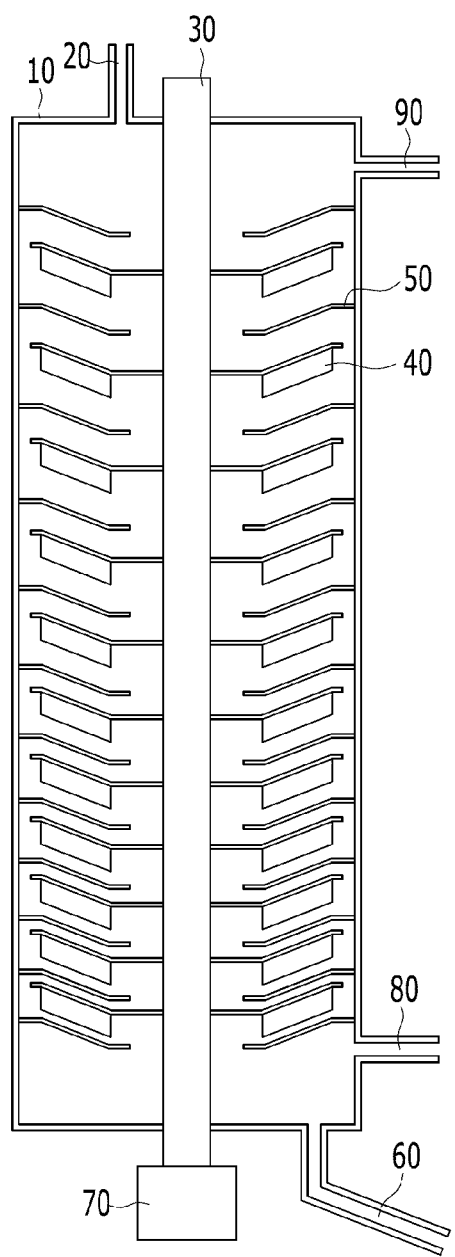

SCC WITH IMPROVED MOBILITY OF MATERIAL TO BE REMOVED

This application is a National Stage Entry of International Application No. PCT/KR2012/004179, now WO 2012/165818, filed on May 25, 2012, and claims the benefit of Korean Patent Application No. 10-2011-0050640, filed on May 27, 2011, and Korean Patent Application No. 10-2012-0056072, filed on May 25, 2012, all of which are hereby incorporated by reference in their entirety for all purposes as if fully set forth herein.

BACKGROUND OF THE INVENTION (a) Field of the Invention

The present invention relates to a SCC (spinning cone column) with improved mobility of material to be removed, more particularly to a SCC with improved mobility of material to be removed due to a wider distance between the upper stages than a distance between the lower stages.

(b) Description of the Related Art

In general, to obtain a product through a chemical reaction, a reaction device is required. As the reaction device, a batch reactor where raw product is added to one reactor, and then, a reaction is conducted through agitation, and the like has been generally used. However, according to this method, sufficient reactions are not achieved for a reaction requiring rapid material transfer speed, thus generating a large amount of non-raw product, and if a catalyst is used, a catalyst separation process is required thus increasing a cost as a reactor has large-capacity.

Therefore, Korean Registered Patent No. 961,765 has suggested a spinning disc reactor, but it has a problem in that disc residence time of raw material is short because spinning discs are horizontally arranged, and thus, a spinning cone column (SCC) with improved residence time of raw materials by multistage installation of inclined discs, namely cones has been preferred.

Meanwhile, the SCC may be applied for a gas liquid contact separation process. If the SCC is applied for a gas liquid contact separation process, stripping medium or gas phase material to be removed, and the like that is introduced in the lower part of the column moves to the upper part of the column. However, in a common SCC, since a distance between the upper stages is identical to or narrower than a distance between the lower stages in the housing, gas flow at the upper part of the column is not smooth, and thus, gas is difficult to be discharged from the column, and liquid flooding may be generated.

SUMMARY OF THE INVENTION

The present invention relates to a SCC with improved mobility of material to be removed due to a wider distance between the upper stages than a distance between the lower stages.

The present invention provides a SCC (Spinning Cone Column) comprising a housing having a rotation axis; a supply part of at least one reactant formed inside of the housing; at least two spinning cones that are installed so as to have a constant gradient from the upper part to the lower part to the rotation axis, move reactants supplied through the reactant supply part, and rotate around the rotation axis; a fixed cone that is fixed and formed on the inner side of the housing, and provides a pathway for sequentially moving reactant from a spinning cone at the upper part to a spinning cone at the lower part; a product collection part for collecting reactants moved through the spinning cone and the fixed cone; and a driving part for rotating the spinning cone, wherein at least one distance between the upper stages is wider than a distance between the lower stages, when one pair of the spinning cone and the fixed cone is referred to as a stage.

Wherein, 2 to 40 spinning cones may be arranged from the upper part to the lower part around the rotation axis.

And, the SCC may be used for polymerization and etherification.

Wherein, the polymerization may be selected from the group consisting of liquid phase polymerization, gas phase polymerization, and free radical polymerization.

And, the surface of the spinning cone may be coated with a catalyst layer, an initiator or a mixture thereof.

And, the spinning cones may rotate around the same rotation axis at a rotation speed where G according to the following Equation 1 may become 1 to 100 times.

$$G = \frac{r\left(\frac{2\pi \times RPM}{60}\right)^2}{9.8} \quad \text{[Equation 1]}$$

Wherein, G is a multiple of gravitational acceleration, r is radius(m) of the cone, and RPM is a rotation speed (times/min).

And, the spinning cone may be equipped with a heater and a temperature control means inside.

And, the SCC may be equipped with a heater and a temperature control means for progressing a reaction on the outer wall or inner wall of the housing, and the driving part may be a motor.

And, the SCC may further comprise a gas supply part and a remaining gas discharge part.

And, the upper stages may be stages included in the half close to the upper part of the housing, and the lower stages may be stages included in the half close to the lower part of the housing, when the number of the stages included in the SCC is divided in two.

And, a distance between the stages may become wider from the lower part to the lower part.

And, the reactant may be a polymer comprising volatile monomers, and the polymer comprising volatile monomers may be selected from the group consisting of PVC, SBR, NBR, ABS, and PBL latex.

According to another aspect of the invention, a method for removing unreacted monomers in polymer by supplying steam inside of the SCC is provided.

The SCC according to the present invention solves a problem that movement of material to be removed is not smooth due to a narrow distance between the upper stages inside of the housing when removing gas phase material to be removed, and may provide a SCC wherein at least one distance between the upper parts is wider than a distance between the lower stages, thus improving mobility of material to be removed.

DETAILED DESCRIPTION OF THE EMBODIMENTS

The present invention may have many examples and various modifications may be made, and specific examples will be illustrated in drawings and explained in detail. However, it should be understood that the present invention is not limited to specific examples, and includes all modifications, equivalents or substitutions within the scope and technical scope of the invention. In the explanations of the invention, detailed explanations of related known technologies may be omitted if it is judged to obscure the subject matter of the invention.

The present invention provides a SCC (Spinning Cone Column) comprising a housing (10) having a rotation axis (30); a supply part (20) of at least one reactant formed inside of the housing; at least two spinning cones (40) that are installed so as to have a constant gradient from the upper part to the lower part to the rotation axis, move reactants supplied through the reactant supply part, and rotate around the rotation axis (30); a fixed cone (50) that is fixed and formed on the inner side of the housing, and provides a pathway for sequentially moving reactant from a spinning cone at the upper part to a spinning cone at the lower part; a product collection part (60) for collecting reactants moved through the spinning cone and the fixed cone; and a driving part (70) for rotating the spinning cone, wherein at least one distance between the upper stages is wider than a distance between the lower stages, when one pair of the spinning cone and the fixed cone is referred to as a stage.

The SCC according to the present invention may provide a SCC wherein at least one distance between the upper stages is wider than a distance between the lower stages, thus improving mobility of material to be removed.

According to one embodiment of the invention, at least two spinning cones (40) may be installed so as to have a constant gradient from the upper part to the lower part along the same rotation axis (30). When the rotation axis rotates, the spinning cones simultaneously rotate to spread supplied reactant on the spinning cone thereby broadening the surface area to facilitate the removal of material to be removed by contact with gas, and the like. Wherein, at least two, preferably 2 to 40, more preferably 2 to 23 spinning cones may be arranged from the upper part to the lower part around the rotation axis.

And, the fixed cone (50) may provide a pathway for sequentially moving reactants from a spinning cone at the upper part to another spinning cone at the lower part. The fixed cone is fixed and formed on the inner side of the housing, and thus, it does not rotate when the rotation axis rotates.

Reactants are supplied to a reactant supply part (20) formed inside of the housing (10), and move to the lower part through the spinning cone (40) and the fixed cone (50) by the rotation of the rotation axis (30). During the movement, material to be removed is removed, and the reactant free of material to be removed moves to a product collection part (60).

Meanwhile, the SCC may be used for polymerization and etherification. Wherein, the reaction using the SCC according to the present invention may include a gas-liquid reaction, and a liquid-liquid reaction, preferably polymerization and etherification.

The polymerization may include liquid phase polymerization, gas phase polymerization, or free radical polymerization, but is not limited thereof. For example, for etherification, reactants including at least one olefin and alcohol are introduced into a spinning cone unit of a first stage through the reactant supply part, and each spinning cone is rotated around the same rotation axis using a motor to progress a reaction, thereby preparing ether or ether mixture. Wherein, the surface of the spinning cone may be coated with zeolite catalyst. And, the olefin may be C2-4 alkene or alkyne, and the alcohol may be C1-8 lower alcohol. And, in case free radical polymerization is progressed, a lamp for providing UV light source may be further installed.

And, the surface of the spinning cone may be coated with a catalyst layer, an initiator or a mixture thereof. The catalyst may include common metal catalysts or metal supported catalysts for polymerization, and the kind is not specifically limited. And, as the initiator, polymerization initiators commonly used for polymerization may be used. And, the thickness of the coating is not specifically limited as long as it may progress a reaction.

And, the spinning cones may rotate around the same rotation axis at a rotation speed where G according to the following Equation 1 may become 1 to 100 times.

$$G = \frac{r\left(\frac{2\pi \times RPM}{60}\right)^2}{9.8} \quad \text{[Equation 1]}$$

Wherein, G is a multiple of gravitational acceleration, r is radius(m) of the cone, and RPM is a rotation speed (times/min).

And, the spinning cone may be equipped with a heater and a temperature control means inside, the SCC may be equipped with a heater and a temperature control means for progressing reactions on the outer wall or inner wall of the housing, and the driving part (70) may be a motor.

And, in case a gas-liquid reaction is progressed, the SCC may further comprise a gas supply part (80) and a remaining gas discharge part (90). Namely, a gas supply part capable of supplying gas to the inside of the housing may be selectively installed on the outer wall of the housing. In this case, it is preferable to install an inlet immediately under the raised spot of the housing inner wall and introduce gas. And, the remaining gas produced after reaction may be discharged through a remaining gas discharge part separately installed at the upper part of the housing.

Furthermore, the housing (10) may be made of stainless steel, but is not limited thereto.

Meanwhile, in a conventional SCC, stripping medium or gas phase material to be removed, and the like moves from the lower part of the column to the upper part of the column. However, in a common SCC, because a distance between the upper stages is identical to or narrower than a distance between the lower stages, gas flow at the upper part of the column is not smooth, and thus, gas is difficult to be discharged in the column, and liquid flooding is generated.

Therefore, in the SCC according to one embodiment of the invention, at least one distance between the upper stages is wider than a distance between the lower stages. By having a structure where at least one distance between the upper stages is wider than a distance between the lower stages, a movement pathway of material to be removed may be secured to facilitate movement thus improving operation efficiency.

Wherein, a 'stage' refers to one pair of adjacent spinning cone and fixed cone. And, 'the upper stage' refers to stages close to the upper part of the housing, and the 'lower stage' refers to stages close to the lower part of the housing, when the number of stages included in the SCC is divided in two. Furthermore, 'a distance between stages' refers to a distance between the spinning cone and the fixed cone.

Meanwhile, a distance between the stages may become wider from the lower part to the upper part of the housing. Namely, a distance between the stages located at the upper part of the housing may be wider than a distance between the stages located at the lower part of the housing, and a distance between the stages may become gradually wider from the lower part to the upper part. FIG. 1 shows the structure of the SCC according to one embodiment wherein a distance between the stages becomes gradually wider from the lower part to the upper part.

According to one embodiment of the invention, the reactant is not specifically limited as long as it is a polymer including volatile monomers, but preferably, it may be selected from the group consisting of PVC, SBR, NBR, ABS, and PBL latex.

If polymer including volatile monomers is supplied through the reactant supply part of the SCC of the present invention, it passes through the spinning cone and the fixed cone by the rotation of the rotation axis, and for example, VCM (vinyl chloride monomer) in PVC latex, or SM (styrene monomer) in SBR latex is discharged to a discharge part as remaining monomers, namely, material to be removed by introduced steam. Wherein at least one distance between the upper stages is wider than a distance between the lower stages, and thus mobility of material to be removed may be improved thus improving operation efficiency.

Although specific embodiments of the present invention have been described in detail, it would be obvious to one of ordinary knowledge in the art that these are no more than preferable examples, and the scope of the invention is not limited thereto. Thus, the scope of the invention is substantially defined by appended claims and equivalents thereof.

What is claimed is:

1. A SCC (Spinning Cone Column) comprising
   a housing having a rotation axis;
   a supply part of at least one reactant formed inside of the housing;
   at least two spinning cones that are installed so as to have a constant gradient from the upper part to the lower part to the rotation axis, move reactants supplied through the reactant supply part, and rotate around the rotation axis;
   a fixed cone that is fixed and formed on the inner side of the housing, and provides a pathway for sequentially moving reactant from a spinning cone at the upper part to a spinning cone at the lower part;
   a product collection part for collecting reactants moved through the spinning cone and the fixed cone; and
   a driving part for rotating the spinning cone,
   wherein at least one distance between the upper stages is wider than a distance between the lower stages, when one pair of the spinning cone and the fixed cone is referred to as a stage.

2. The SCC according to claim 1, wherein 2 to 40 spinning cones are arranged from the upper part to the lower part around the rotation axis.

3. The SCC according to claim 1, wherein the SCC is used for polymerization and etherification.

4. The SCC according to claim 3, wherein the polymerization is selected from the group consisting of liquid phase polymerization, gas phase polymerization, and free radical polymerization.

5. The SCC according to claim 1, wherein the surface of the spinning cone is coated with a catalyst layer, an initiator or a mixture thereof.

6. The SCC according to claim 1, wherein the spinning cone rotates around the same rotation axis at a rotation speed where G according to the following Equation 1 becomes 1 to 100 times:

$$G = \frac{r\left(\frac{2\pi \times RPM}{60}\right)^2}{9.8} \quad \text{[Equation 1]}$$

wherein, G is a multiple of gravitational acceleration, r is radius(m) of the cone, and RPM is a rotation speed (times/min).

7. The SCC according to claim 1, wherein the spinning cone is equipped with a heater and a temperature control means inside.

8. The SCC according to claim 1, wherein the SCC is equipped with a heater and a temperature control means for progressing a reaction on the outer wall or inner wall of the housing.

9. The SCC according to claim 1, further comprising a gas supply part and a remaining gas discharge part.

10. The SCC according to claim 1, wherein the upper stages are stages included in the half close to the upper part of the housing, and the lower stages are stages included in the half close to the lower part of the housing, when the number of the stages included in the SCC is divided in two.

11. The SCC according to claim 1, wherein a distance between the stages becomes wider from the lower part to the upper part.

12. The SCC according to claim 1, wherein the reactant is polymer including volatile monomers.

13. The SCC according to claim 12, wherein the polymer including volatile monomers is selected from the group consisting of PVC, SBR, NBR, ABS, and PBL latex.

14. The SCC according to claim 1, wherein the SCC is for removal of unreacted monomers in polymer.

15. A method for removing unreacted monomers in polymer using the SCC according to claim 1,
   wherein the method comprising the steps of:
   supplying at least one reactant to the supply part, wherein the reactant being a polymer including volatile monomers;
   removing unreacted monomers by the introduction of steam; and
   collecting the product in the product collection part.

* * * * *